No. 798,433. PATENTED AUG. 29, 1905.
J. I. MAGUIRE.
WHEEL.
APPLICATION FILED MAY 10, 1905.
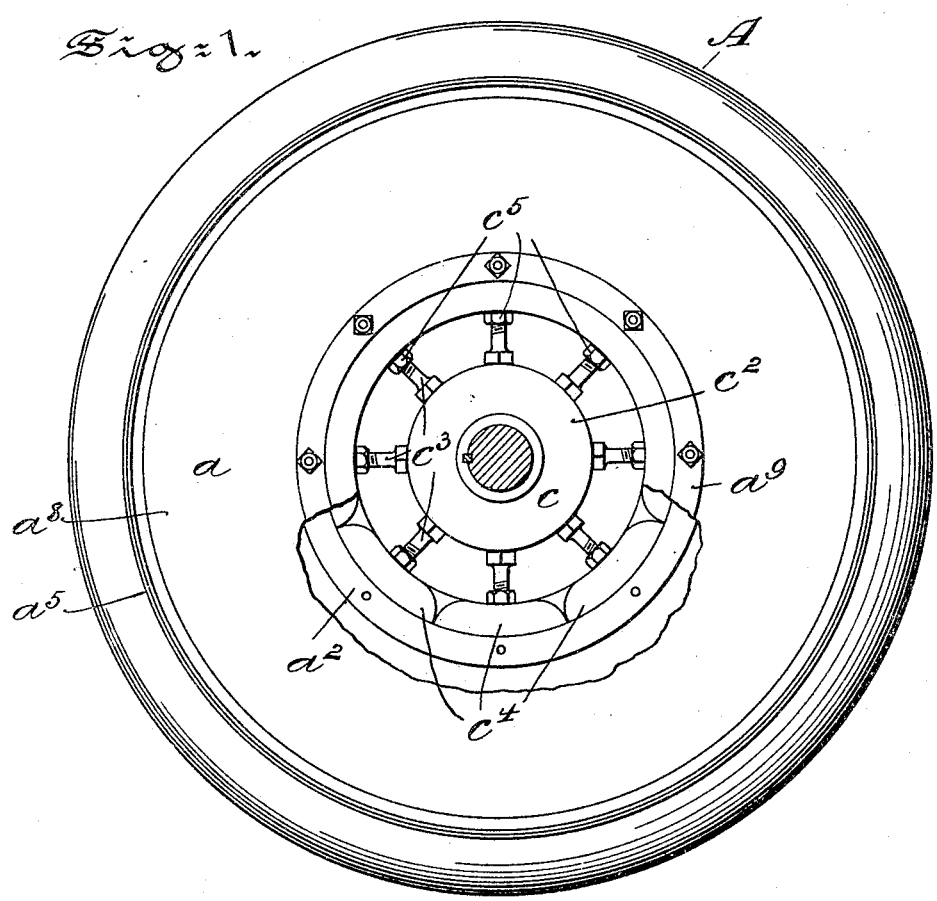
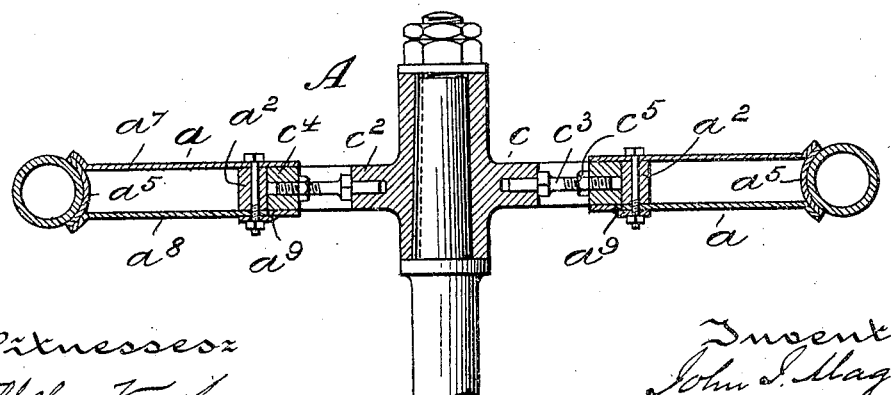

UNITED STATES PATENT OFFICE.

JOHN I. MAGUIRE, OF WAYNE, PENNSYLVANIA.

WHEEL.

No. 798,433.   Specification of Letters Patent.   Patented Aug. 29, 1905.

Application filed May 10, 1905. Serial No. 259,670.

*To all whom it may concern:*

Be it known that I, JOHN I. MAGUIRE, a citizen of the United States, residing at Wayne, in the county of Delaware and State of Pennsylvania, have invented certain new and useful Improvements in Wheels, of which the following is a specification.

My invention has relation to improvements in wheels for vehicles, and in such connection it relates to the general construction and arrangement of such wheels.

Hitherto wheels have been designed solid to be driven either by an axle or other means when the wheels were mounted loosely on the axle or shaft. Such wheels when employed on automobiles as rear or driving wheels required special mechanism to permit the wheels driven with equal speed to turn with unequal speed in passing round corners or in the movement of the vehicles in curves to overcome so-called "skidding" or of the turning of one of the wheels, which in such movements describes or moves in a smaller curve. Furthermore, in instances where the motor of such a vehicle becomes unmanageable and incapable of being stopped the wheels positively driven by the motor could not be prevented from rotation by the application of a brake without destruction of the same. Neither could the wheels in the case of an accident be suddenly stopped by the brake without causing overturning of the vehicle.

The principal objects of my invention are therefore to overcome the above-mentioned disadvantages and to provide a wheel formed of disconnected sections concentrically arranged with respect to each other, which under normal conditions permit the driving of the wheel by engaging and positively turning one of its sections, while under abnormal conditions permit the free turning of one section within the other.

The nature and characteristic features of my invention will be more fully understood from the following description, taken in connection with the accompanying drawings, forming part hereof, in which—

Figure 1 is a side elevational view of a wheel embodying main features of my invention having a certain portion thereof broken away, and Fig. 2 is a cross-sectional view thereof.

Referring to the drawings, A represents a wheel consisting of two sections $a$ and $c$ abutting directly against each other, with the hub extension $c^2$ of the inner section $c$ provided with bolts $c^3$, loosely mounted therein, the threaded ends of which engage blocks $c^4$, bearing against the ring $a^2$ of the outer section $a$. By the turning of the bolts $c^3$ the frictional engagement of the blocks $c^4$ with the ring $a^2$ can be regulated according to the load the wheel is normally adapted to carry and also to take up the wear between the blocks $c^4$ and the ring $a^2$. After the bolts $c^3$ have been turned the same are held in the position given by the jam-nuts $c^5$ bearing against the blocks $c^4$, as shown in Fig. 2. In this wheel the spokes are dispensed with and are replaced by disks $a^7$ and $a^8$, secured, respectively, to the rim $a^5$ of the section $a$ and the ring $a^2$. In order to form a channel-way and to permit free removal and reinsertion of the blocks $c^4$ into the channel-way, the disk $a^7$ is extended beyond the ring $a^2$ and a removable ring $a^9$ provided, which forms an extension of the disk $a^8$, as shown in Fig. 2.

Having thus described the nature and objects of my invention, what I claim as new, and desire to secure by Letters Patent, is—

1. A wheel, consisting of inner and outer sections abutting directly against each other, the inner section being provided with a hub extension having bolts, the threaded ends of which bolts engage blocks bearing against a ring of said outer section, disks detachably connected with the rim and ring of said outer section, a channel-way to permit the removal and insertion of said blocks, one of said disks being extended beyond said ring and a removable ring to form an extension of said disk.

2. A wheel, consisting of inner and outer sections abutting directly against each other, said inner section being provided with a hub extension having bolts, the outer ends of which engage blocks adapted to bear against the ring of said outer section, a channel-way to permit the insertion and removal of said blocks, and means for supporting said bolts in any given position.

In witness whereof I have hereunto set my signature in the presence of two subscribing witnesses.

JOHN I. MAGUIRE.

Witnesses:
J. WALTER DOUGLASS,
THOMAS M. SMITH.